United States Patent [19]

Whetstone et al.

[11] 4,214,879

[45] Jul. 29, 1980

[54] DEGASSING APPARATUS

[75] Inventors: James A. Whetstone, Cloverdale, Calif.; George W. Tillett, 50 Zahner Way, Cloverdale, Calif. 95425

[73] Assignee: George W. Tillett, Cloverdale, Calif.

[21] Appl. No.: 973,524

[22] Filed: Dec. 26, 1978

[51] Int. Cl.$^2$ ............................................. B01D 45/14
[52] U.S. Cl. .................................... 55/191; 210/192; 210/203
[58] Field of Search .............. 210/178, 184, 185, 186, 210/190, 192, 193, 202, 203, 191

[56] References Cited

U.S. PATENT DOCUMENTS

| | | | |
|---|---|---|---|
| 3,481,113 | 12/1969 | Burnham et al. | 55/193 X |
| 4,049,244 | 9/1977 | Hedrich | 55/190 |
| 4,084,946 | 4/1978 | Burgess | 55/184 |

OTHER PUBLICATIONS

Development and Description of Drilco's See-Flow Atmospheric Degasser by Liljestrand, A publication of Drilco Division of Smith International, Houston, Texas, 1976.

Primary Examiner—John Adee
Attorney, Agent, or Firm—Warren, Chickering & Grunewald

[57] ABSTRACT

A degassing apparatus which has a degassing head from which extends a tube; a shaft is rotated in the tube; a screw conveyor above intake holes of the tube conveys drill mud upward against a deflector disc at the open top of the tube; three rows of inwardly inclined baffles around the side wall of the degassing head are so arranged that the baffles of the various rows are staggered relatively to one another; the mud flows by gravity to the inclined bottom of the head and to an outlet leading out of the head to a container for the degassed mud; a fan above the deflector disc sucks air through the mud spray and out through an outlet; a conduit conducts gas from below the mud spray to the fan and a vent; the shaft at the bottom of the tube is held in a bearing protected against influx of mud; adjustable legs on the degasser head are adapted to support the head on top of a vessel in which the drill mud is contained.

11 Claims, 10 Drawing Figures

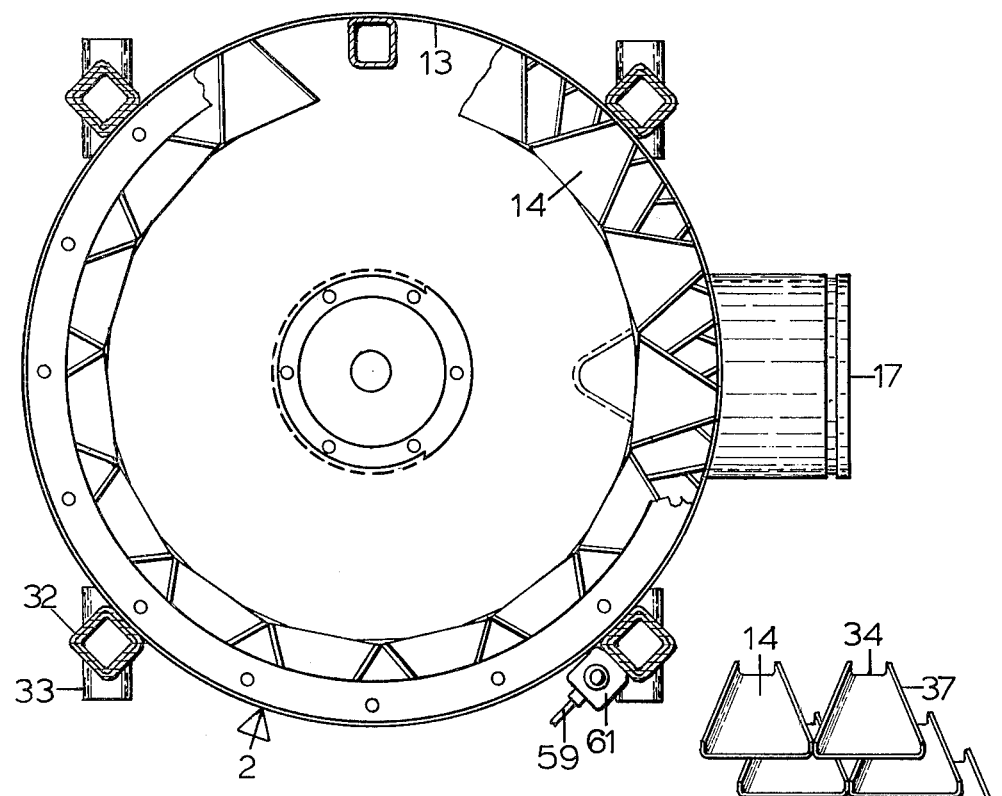
FIG. 4
FIG. 5
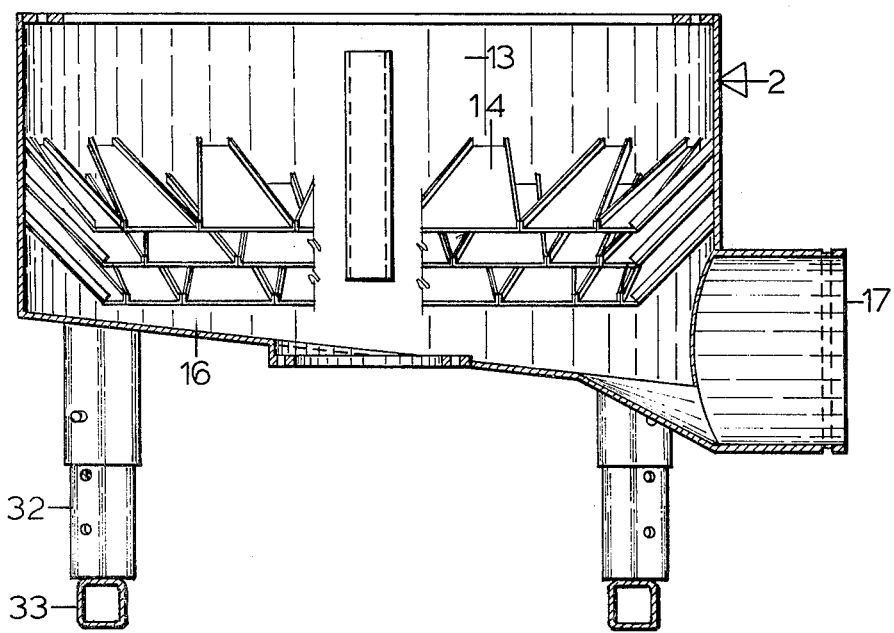
FIG. 6

DEGASSING APPARATUS

STATE OF THE ART

Prior devices of which applicant is aware include degassing apparatus with a complex combination of several paths through which the drill mud is conveyed for the purpose of degassing; others have various complex methods such as centrifugal pumps and the like.

The primary object of this invention is to provide an efficient degassing device for drilling mud which obviates the use of centrifugal pumps and complicated passages through which the mud is forced for degassing; and to provide a simple device with minimum moving parts to accomplish by a single upward passage and proper radial deflection the degassing of the mud.

Another object of the invention is to provide a degassing device which can be simply and easily mounted on a vessel containing drill-mud and which operates positively by scattering the drill mud laterally in such a way that the gases therein are sucked out of the mud efficiently.

BRIEF DESCRIPTION OF THE FIGURES

FIG. 4 is a top view of the degasser head; the top cover being partly broken away.

FIG. 5 is a perspective view of a portion of the rows of the offset baffles.

FIG. 6 is a sectional view of the degasser head and its supports.

DETAILED DESCRIPTION

Figure 1:
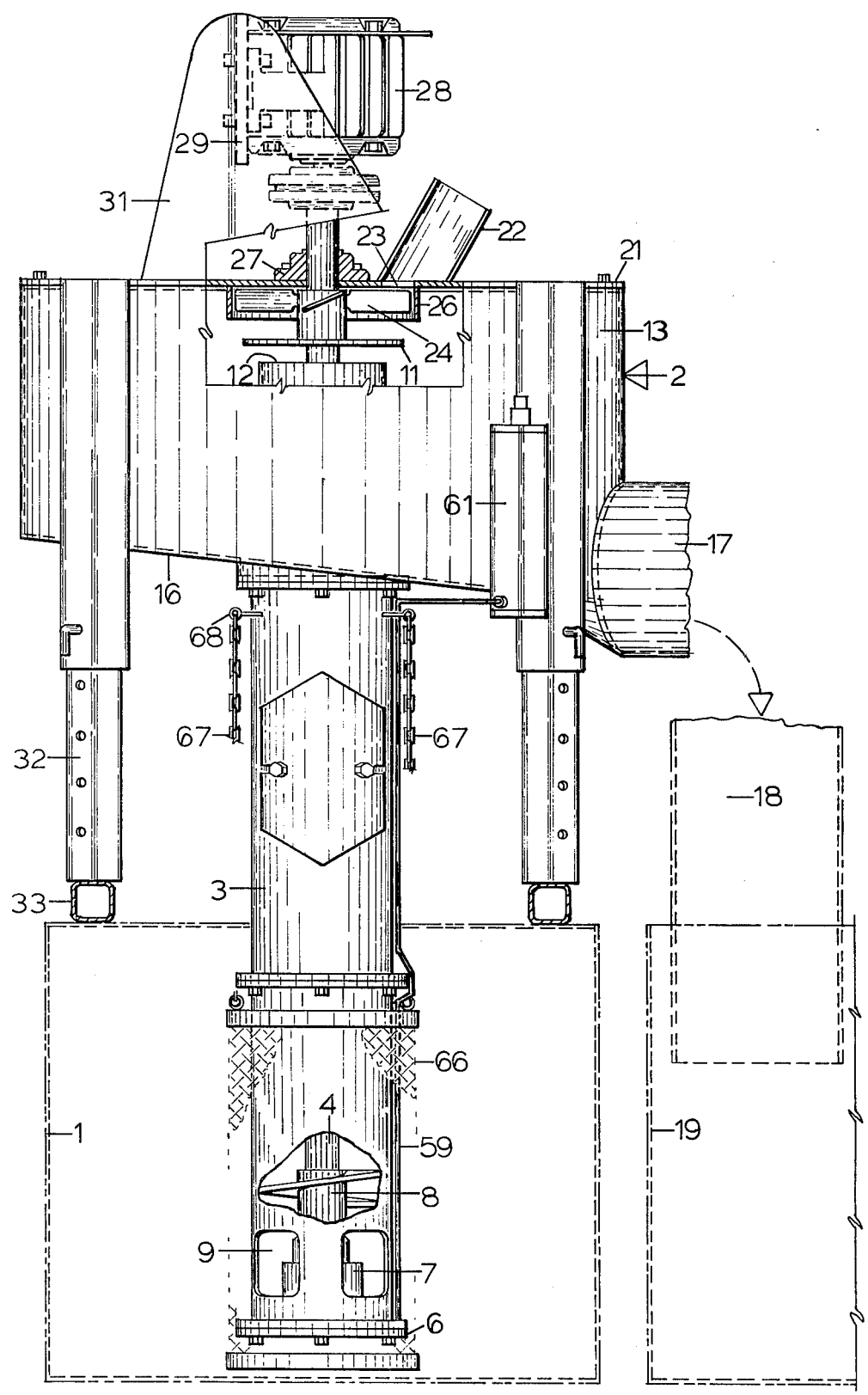
FIG. 1 is a partly sectional view of the degasser apparatus.
Figure 2:
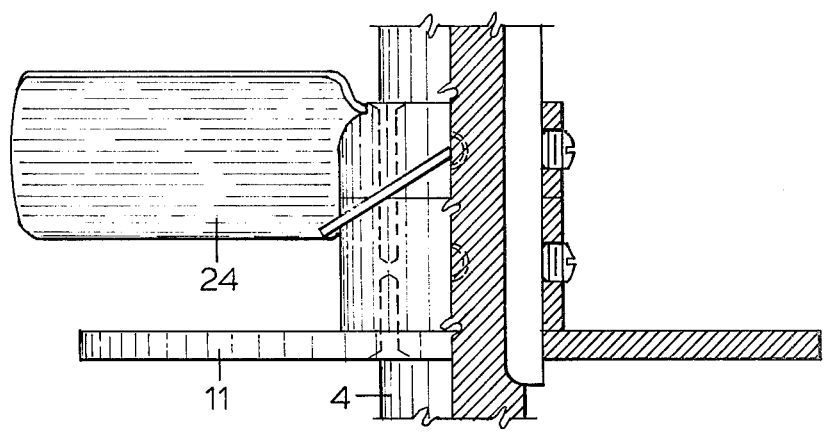
FIG. 2 is a partly sectional subassembly showing the suction fan and the scatter disc on the shaft of the degasser.

The raw drill mud is introduced in the usual manner into a vessel 1. A degasser head 2 is supported on the top of the vessel 1. A tube 3 is hung from the degasser head 2. A shaft 4 is rotatable concentrically in the tube 3. The shaft is supported above a base plate 6 of the tube 3 on a suitable bearing structure 7. A screw impeller 8 is secured on the shaft 4 above the bearing structure 7 to force the mud up in the tube 3. At about the bearing structure 7 the tube has a plurality of intake ports 9 through which the drill mud flows into the tube 3 and then it is moved upwardly by the impeller 8 into the degasser head 2.

A deflector or scatter disc 11 is mounted on the shaft 4 spaced above the upper open end 12 of the tube 3. The side wall 13 of the degasser head 2 is substantially cylindrical. A plurality of rows of staggered baffles 14 extend from the side wall 13 inwardly and downwardly so that the drill mud deflected on them flows downwardly by gravity. The bottom 16 of the degasser 2 is inclined toward an outlet conduit 17 to which a discharge conduit 18 is suitably connected for discharging the degassed mud into another vessel 19 shown diagrammatically in broken lines in FIG. 1.

A cover plate 21 is secured to the top of the side wall 13. It has an air conduit 22 above an air vent 23. Below the air vent 23 and near the cover plate 21 is a suction fan 24 on the shaft 24, surrounded by a shroud 26 for drawing the liberated gases upwardly and out to the vent 23 and air conduit 22.

Figure 7:
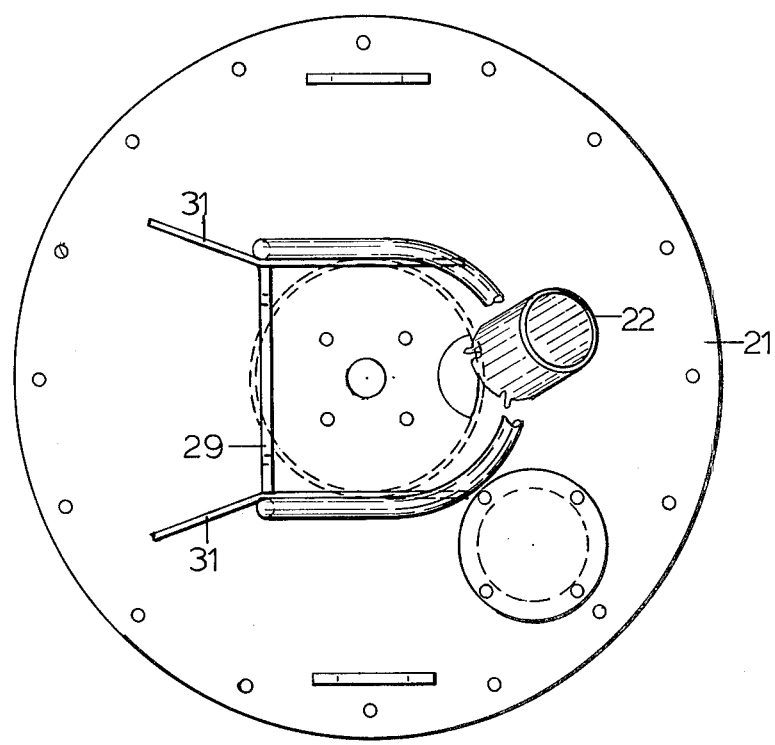
FIG. 7 is a plan view of the top of the degasser head showing the motor support.
Figure 8:
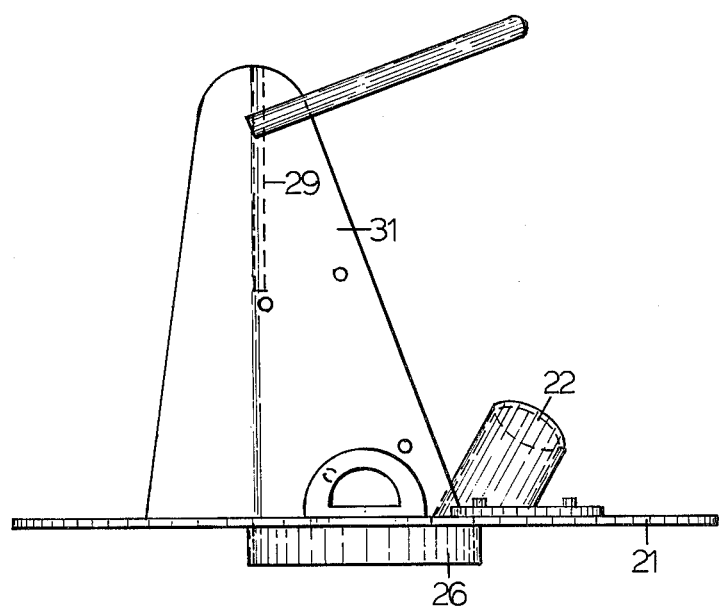
FIG. 8 is a side view of the top of the degasser head showing the motor support.
Figure 9:
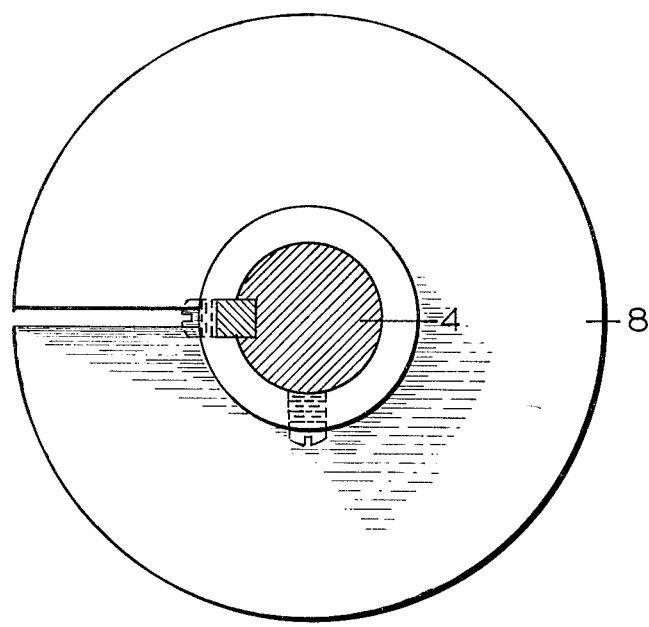
FIG. 9 is a top plan view of the screw impeller.
Figure 10:
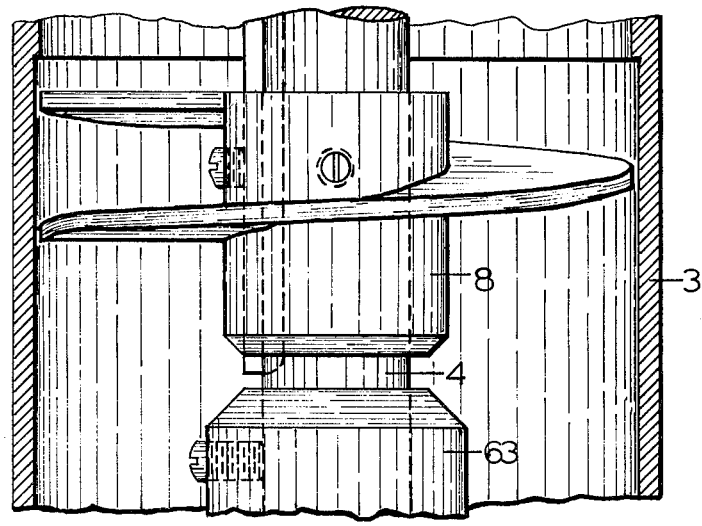
FIG. 10 is a side view of the screw impeller on a larger scale.

The shaft 4 extends through a bearing 27 on the top of the cover plate 21. An electric motor 28 is mounted on a bracket plate 29 and is suitably coupled with the shaft 4 for rotating the same. The bracket plate 29 is supported on a bracket 31 on the top plate 21 as shown in FIGS. 7 and 8. Telescopic legs 32 extend from the exterior of the side wall 13 to be supported on tranverse tubular feet 33, which may rest on the top of vessel 1, or if the vessel top is open, then receive a pipe therethrough to rest on the rim of the vessel 1.

Each baffle 14 is a shallow tapered channel so that the narrower end 34 is secured to the side wall 13 and the wider end 36 is spaced inwardly from the side wall 13 with the baffle being inclined inwardly and downwardly. A shallow flange 37 extends upward along each longitudinal edge of each baffle. In each row the flanges at the wider end 36 of the adjacent baffles are in contact. The baffles in the next row below the top row of baffles are offset and staggered relatively to the top row in such a manner that the baffles are below the gap between adjacent baffles of the top row. The baffles at the bottom row are staggered relatively to the baffles of the middle row similarly so as to be beneath the gaps between the converging adjacent flanges of the adjacent baffles of the middle row. All the mud scattered on the baffles 34 flows on the respective baffles downwardly by gravity in comparatively thin sheets and liberated gases are drawn through the deflected mud spray and flow to be discharged through the top vent 23 and conduit 22. For conducting gas trapped below the scattered mud a gas transfer conduit 38 is provided along the side wall 13 as shown in FIG. 6.

Figure 3:
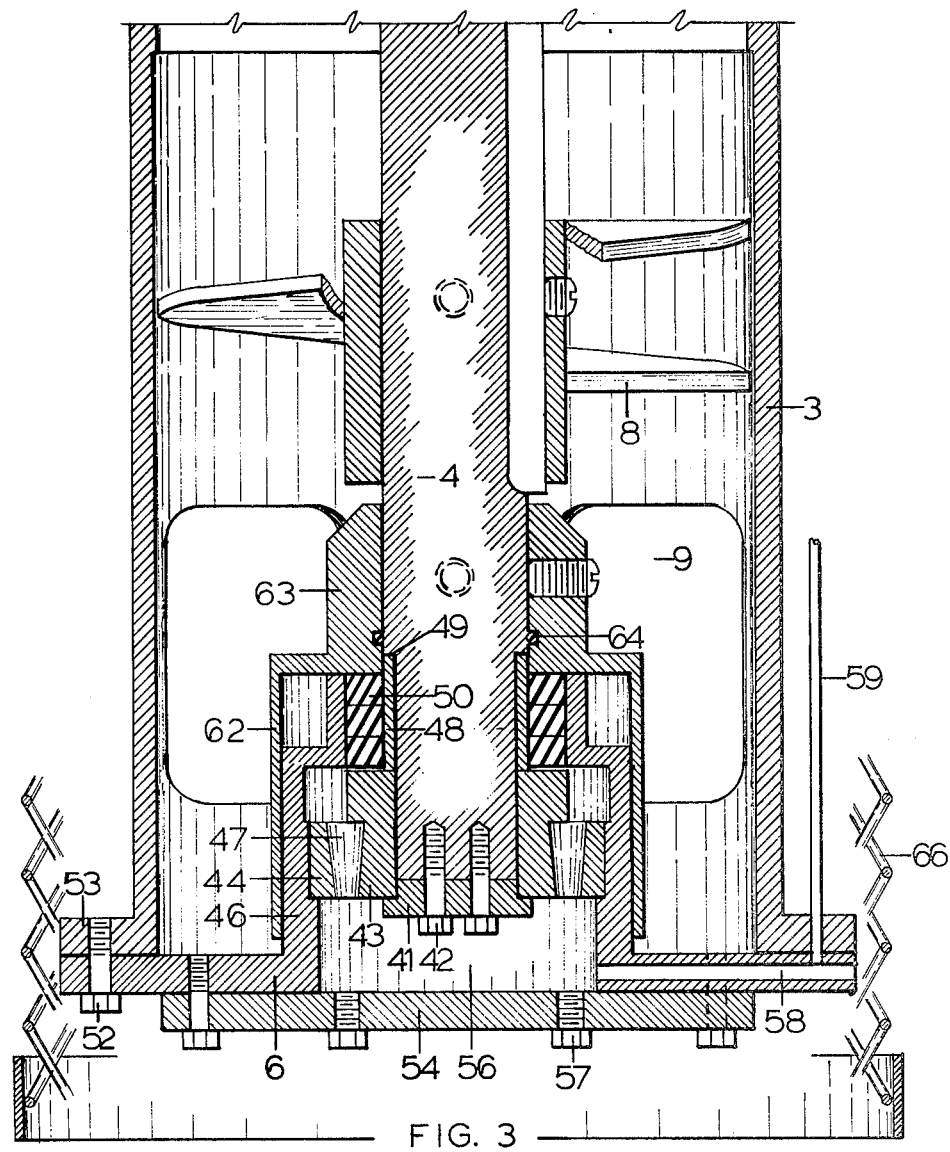
FIG. 3 is a fragmental sectional view of the lower portion of the degasser apparatus.

The sealed bearing structure 7 shown in FIG. 3 includes a cap 41 secured by bolts 42 to the bottom end of the shaft 4. An inner bearing race 43 is pressed on the shaft 4 and rests on the cap 41. The outer bearing race 44 is suitably secured to a bearing housing 46 to confine rollers 47. A sleeve 48 on the reduced end of the shaft 4 is between a shoulder 49 of the shaft 4 and the top of the inner bearing race 43.

A neck 50 on the upper end of the bearing housing 46 contains a plurality of neoprene sealing washers around the sleeve 48. The bearing housing 46 is integral with the base plate 6, which latter is secured by bolts 52 to a flange 53 of the tube 3. An access plate 54 is bolted to the base plate 6 to cover the access hole 56, which latter corresponds to the inside diameter of the bearing housing 46. Plugs 57 in the access plate 54 are provided for draining the lubricant from the bearing housing 46.

A passage 58 in the bottom plate 6 communicates with the bearing housing 46. A tube 59 extends from said passage 58 upwardly along the exterior of the tube 3 to a reservoir 61, see FIG. 4, whereby lubricant flows into the bearing housing 46 and keeps it suitably filled.

For further protecting the bearings against the mud, a sealing hood 62 surrounds the bearing housing 46. The hub 63 of the sealing hood 62 is secured to the shaft 4 whereby it rotates with the shaft 4 and keeps the mud out of the bearing housing 46. An O ring 64 seals the hub 63.

A screen 66 surrounds the lower portion of the tube 3 to prevent large lumps of impurities from obstructing the intake ports 9. The cylindrical screen 66 is hung on chains 67, the upper ends of which are hung on hooks 68 under the bottom 16 of the degasser head 2. Thus, the screen can be pulled out of the vessel 1 for removing lumps or other obstruction caught on the screen.

In operation the raw drill mud is poured in the vessel 1 and it pours by gravity into the intake ports 9. As the shaft 4 is rotated the impeller 8 conveys the mud under pressure upwardly in the tube. When the mud reaches the upper open end 42 of the tube 3 it impacts upon the scatter disc 11 and is deflected and sprayed in a substantially horizontal plane outwardly onto the baffles 14. The fan 24 draws air through the mud spray and discharges the liberated gases and impurities from the mud. The degassed mud flows by gravity to be inclined bottom 16 of the degasser head 2 and flows out through the outlet 17 to be conveyed in a conventional manner into another vessel for further use in drilling.

I claim:

1. A degasser apparatus comprising:
   a conduit having an inlet adapted for mounting in and formed to receive drilling mud to be recycled and an open mud discharge end;
   a positive displacement rotary screw impeller mounted in said conduit adjacent said inlet and a drive shaft connected to said impeller and extending longitudinally through said conduit and from said discharge end;
   motive means connected to and for driving said shaft for inducting mud into said inlet and for driving said mud longitudinally through said conduit around said shaft and for hurling said mud from said discharge end; and
   a mud deflector wall mounted in surrounding relation to said shaft and in a plane substantially perpendicular thereto and in spaced relation to said end for intercepting said mud and causing said mud to fan out in a thin sheet for liberation of gas entrapped therein.

2. The apparatus of claim 1,
   said wall being mounted for rotation and connected to and driven by said motive means for centrifugally driving said mud sheet.

3. The apparatus of claim 2,
   said wall comprising a circular disc mounted centrally on said shaft and for rotation therewith.

4. The apparatus of claim 1,
   and means providing a reduced air pressure on one side of said sheet for drawing off liberated gas.

5. The apparatus of claim 4,
   and a conduit extending from the opposite side of said sheet to said one side for drawing off gas liberated at said opposite side.

6. The apparatus of claim 3,
   means providing a reduced air pressure on one side of said sheet for drawing off liberated gas; and
   a conduit extending from the opposite side of said sheet and to said one side for drawing off gas liberated at said opposite side.

7. The apparatus of claim 3,
   a housing having a substantially cylindrical side wall mounted on a substantially vertical axis substantially concentric to said conduit and disc, thus positioning said wall for intercepting at substantially right angles the radially cast mud; and
   baffles on said wall positioned for receipt and gravitation thereover of said mud.

8. The apparatus of claim 7,
   means providing a reduced air pressure above said sheet for drawing off liberated gas; and
   a conduit extending from adjacent said baffles at the underside of said sheet to the upper side of said sheet for drawing off gas liberated from the mud at the underside of said sheet and said baffles.

9. The apparatus of claim 8,
   said baffles being disposed in a plurality of vertically superimposed circumferentially extending rows with the baffles in each row staggered from the baffles in the adjacent row; and
   each baffle forming a downwardly inclined tapered channel having its narrower end at said wall and its wider end spaced radially inwardly from said wall.

10. The apparatus of claim 1,
    said conduit having a normally vertical longitudinal position in use with said inlet spaced above a lower end of said conduit;
    a bearing housing mounted in said lower conduit end concentrically thereof, said shaft having a lower end extending below said impeller and concentrically within said housing;
    a bearing mounted to and between said housing and shaft for journaling said shaft in said housing; and
    means inhibiting mud entry to said bearing comprising a hood member secured to said shaft for rotation therewith and superimposed over and depending into surrounding relation to said housing for centrifugally displacing mud therefrom.

11. The apparatus of claim 10,
    and a hydrostatic lubricant feed connected to said housing for supplying lubricant to and for maintaining a head of lubricant on said bearing.

* * * * *